(12) United States Patent
Yamashita et al.

(10) Patent No.: US 9,490,680 B2
(45) Date of Patent: Nov. 8, 2016

(54) POWER GENERATOR POWER GENERATION FACILITY

(71) Applicant: MITSUBISHI HEAVY INDUSTRIES, LTD., Tokyo (JP)

(72) Inventors: Yukio Yamashita, Minato-ku (JP); Keiichi Shiraishi, Minato-ku (JP); Yoshihisa Ono, Minato-ku (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/804,981

(22) Filed: Jul. 21, 2015

(65) Prior Publication Data
US 2015/0326095 A1 Nov. 12, 2015

Related U.S. Application Data

(62) Division of application No. 13/818,362, filed as application No. PCT/JP2011/079217 on Dec. 16, 2011, now Pat. No. 9,163,546.

(30) Foreign Application Priority Data

Dec. 27, 2010 (JP) .................................. 2010-289839
Dec. 27, 2010 (JP) .................................. 2010-289840

(51) Int. Cl.
*F02B 37/00* (2006.01)
*H02K 7/18* (2006.01)
(Continued)

(52) U.S. Cl.
CPC ............... *H02K 7/1823* (2013.01); *F01N 5/04* (2013.01); *F02B 37/00* (2013.01); *F02B 37/24* (2013.01); *F02D 29/06* (2013.01); *H02J 3/46* (2013.01); *H02K 1/12* (2013.01); *H02K 1/272* (2013.01); *H02K 21/14* (2013.01); *H02P 9/04* (2013.01);
(Continued)

(58) Field of Classification Search
USPC .......................................................... 290/1 R
See application file for complete search history.

(56) References Cited

U.S. PATENT DOCUMENTS 2,655,611 A  10/1953 Sherman
3,849,682 A  11/1974 Binns
(Continued)

FOREIGN PATENT DOCUMENTS

CN  101376430   3/2009
CN  101563272   10/2009
(Continued)

OTHER PUBLICATIONS

International Search Report issued Mar. 19, 2012 in International (PCT) Application No. PCT/JP2011/079217.
(Continued)

*Primary Examiner* — Joseph Waks
(74) *Attorney, Agent, or Firm* — Wenderoth, Lind & Ponack, L.L.P.

(57) ABSTRACT

In a power generation facility, there are provided a plurality of diesel engines, a plurality of turbochargers driven by exhaust gas from the diesel engines, a plurality of power generators connected to the plurality of turbochargers, a plurality of converters for converting AC power generated by the plurality of power generators to DC power, one inverter for converting the DC power outputted from the plurality of converters to AC power, and a main controller for controlling the converters in accordance with the AC power from the inverter, by which stable electric power can be generated.

4 Claims, 3 Drawing Sheets

(51) Int. Cl.

| | |
|---|---|
| *H02J 3/46* | (2006.01) |
| *H02K 21/14* | (2006.01) |
| *H02P 9/04* | (2006.01) |
| *F01N 5/04* | (2006.01) |
| *F02B 37/24* | (2006.01) |
| *F02D 29/06* | (2006.01) |
| *H02K 1/12* | (2006.01) |
| *H02K 1/27* | (2006.01) |
| *F02B 37/12* | (2006.01) |

(52) U.S. Cl.
 CPC ...... *F02B 2037/122* (2013.01); *F05B 2220/40* (2013.01); *H02K 2213/12* (2013.01); *Y02T 10/144* (2013.01); *Y02T 10/16* (2013.01)

(56) References Cited

U.S. PATENT DOCUMENTS

| | | |
|---|---|---|
| 4,719,756 A | 1/1988 | Streuli |
| 4,745,754 A | 5/1988 | Kawamura |
| 4,760,702 A | 8/1988 | Ammann et al. |
| 4,827,170 A | 5/1989 | Kawamura et al. |
| 4,850,193 A | 7/1989 | Kawamura |
| 5,306,997 A | 4/1994 | Akiyama |
| 5,323,613 A | 6/1994 | Akiyama |
| 6,170,443 B1 | 1/2001 | Hofbauer |
| 6,259,180 B1 | 7/2001 | Pop, Sr. |
| 6,335,582 B1 | 1/2002 | Abukawa et al. |
| 6,611,078 B1 | 8/2003 | Durham et al. |
| 7,791,237 B2 | 9/2010 | Shah et al. |
| 8,783,015 B2 | 7/2014 | Hofbauer |
| 2003/0062792 A1 | 4/2003 | Reiter et al. |
| 2003/0193258 A1 | 10/2003 | Reiter, Jr. et al. |
| 2009/0308036 A1 | 12/2009 | Sheidler |
| 2010/0031638 A1 | 2/2010 | Sheidler |
| 2010/0293912 A1 | 11/2010 | Mackin et al. |
| 2011/0031931 A1 | 2/2011 | Rembach et al. |
| 2011/0146634 A1 | 6/2011 | Iwatani et al. |
| 2014/0159378 A1 | 6/2014 | Wright |

FOREIGN PATENT DOCUMENTS

| | | |
|---|---|---|
| CN | 101713328 | 5/2010 |
| DE | 3711863 | 10/1988 |
| EP | 66234 | 12/1982 |
| EP | 352063 | 1/1990 |
| GB | 2299217 | 9/1996 |
| JP | 62265417 | 11/1987 |
| JP | 2-75724 | 3/1990 |
| JP | 6-335181 | 12/1994 |
| JP | 08275470 | 10/1996 |
| JP | 08312360 | 11/1996 |
| JP | 10-89017 | 4/1998 |
| JP | 10-243586 | 9/1998 |
| JP | 2003-009537 | 1/2003 |
| JP | 2003219586 | 7/2003 |
| JP | 2004-80980 | 3/2004 |
| JP | 3699134 | 9/2005 |
| JP | 2005-344539 | 12/2005 |
| JP | 2008-286016 | 11/2008 |
| JP | 2009-257098 | 11/2009 |
| JP | 2010-116070 | 5/2010 |
| WO | 2010/098360 | 9/2010 |

OTHER PUBLICATIONS

Notice of Allowance issued Sep. 29, 2014 in corresponding Korean patent application No. 10-2013-7004304 (with partial English Translation).

Notice of Allowance issued Apr. 24, 2015 in corresponding Chinese patent application No. 201180041310.2 (with English translation).

POWER GENERATOR POWER GENERATION FACILITY

BACKGROUND OF THE INVENTION

1. Technical Field

The present invention relates to a power generator to generate electric power, and a power generation facility mounted on a vessel, and a power generation facility that controls power generation by a plurality of power generators connected to a plurality of turbochargers.

2. Description of the Related Art

For example, on a vessel, a plurality of diesel engines are mounted for propulsion, and these diesel engines each have a turbocharger (supercharger). In view of energy saving, a power generator has been considered, wherein a power generator that collects energy of exhaust gas as electric power is connected to at least one of the plurality of turbochargers.

For example, in a supercharging device described in Japanese Laid-open Patent Publication No. 2009-257098, an exhaust gas turbine turbocharger, which is in a parallel running state to a exhaust gas turbine turbocharger during engine operation, is provided, a power generator is mounted on the exhaust gas turbine turbocharger, and a power generation amount of the power generator is controlled so that a rotation speed of the exhaust gas turbine turbocharger matches a rotation speed of the exhaust gas turbine turbocharger. Moreover, in a design and a manufacturing method of a power generator described in Japanese Patent No. 3699134, not by changing a diameter of a given traverse section but by adjusting a length of the given traverse section, the power generators having the same traverse section diameter are designed and manufactured, which enables standardization of various parts to be achieved. Moreover, an electric power converting device described in Japanese Laid-open Patent Publication No. 2003-009537 is configured so that a plurality of power generators are connected on DC through a booster circuit and a backflow prevention diode and electric power is supplied to an electric power system by one inverter.

SUMMARY OF THE INVENTION

1. Technical Problem

In JP 2009-257098 and JP 3699134 described above, the power generator applied to the exhaust gas turbine turbocharger, the design and the manufacturing method of the power generator are described. However, in the above-described power generator, although by adjusting the length of the given traverse section, the power generators having the same traverse section diameter can be designed and manufactured, thereby enabling the standardization of the various parts to be achieved, sufficient standardization has not yet been achieved.

Moreover, in the above-described publications, the techniques of controlling the power generation amount of the power generator so that the rotation speed of the exhaust gas turbine turbocharger matches the rotation speed of the exhaust gas turbine turbocharger and connecting the plurality of power generators on DC through the booting circuit and the backflow prevention diode to control the same by the one inverter are described. Since the plurality of diesel engines vary the rotation speed, it is difficult to assure the stable power generation amount.

The present invention was devised to solve the above-described problems, and an object thereof is to provide a power generator and a power generation facility that enables low cost by achieving standardization of various components. Another object of the present invention is to provide a power generation facility capable of generating stable electric power.

2. Solution to the Problem

According to a power generation facility of the present invention in order to achieve the object, the power generation facility includes: a plurality of exhaust gas generating sources; a plurality of turbochargers driven by exhaust gas from the plurality of exhaust gas generating sources; a plurality of power generators connected to the plurality of turbochargers; a plurality of converters that convert AC power generated by the plurality of power generators to DC power; one inverter that converts the DC power outputted from the plurality of converters to AC power; and a control device that controls the plurality of exhaust gas generating sources or the plurality of turbochargers in accordance with the AC power from the inverter.

Accordingly, the plurality of exhaust gas generating sources or the plurality of turbochargers are controlled so that the AC power from the inverter becomes desired electric power, by which stable electric power can be generated.

According to the power generation facility of the present invention, the plurality of exhaust gas generating sources are engines, and the control device controls the engines so that the AC power from the inverter becomes constant.

Accordingly, by controlling an intake air amount, a fuel supply amount, ignition timing, the rotation speed and the like, stable electric power can be generated.

According to the power generation facility of the present invention, the plurality of turbochargers are variable capacity type turbochargers, and the control device controls supercharging pressure in the turbochargers so that the AC power from the inverter becomes constant.

Accordingly, by adjusting a exhaust gas amount, flow velocity and the like in the variable capacity type turbochargers to control the supercharging pressure, the stable electric power can be generated.

According to the power generator of the present invention, the power generator includes: a rotary shaft; a rotor fixed to the rotary shaft; and a stator provided outside the rotor, wherein the rotor has: an iron core fixed to the rotary shaft; a magnet fixed to an outer circumferential surface of the iron core and axially divided into a plurality of pieces; and a retaining ring arranged on an outer circumferential surface of the magnet and axially divided into a plurality of pieces.

Accordingly, the magnet and the retaining ring making up the rotor are constructed by being axially divided into the plurality of pieces, and thereby, in accordance with a required specification of the power generator, outer diameters of the magnet and the retaining ring are uniform, and on the other hand, axial lengths only needs to be set, using predetermined numbers of the divided pieces, so that the standardization of the various components can be achieved, thereby enabling low cost.

According to the power generator of the present invention, the magnet has a ring shape or an arch shape, and has the divided pieces of a same outer diameter and a same axial length, and the retaining ring has a ring shape, has the divided pieces of a same outer diameter and a same axial length, and is fitted and fixed onto the outer circumferential surface of the magnet.

Accordingly, the magnet and the retaining ring making up the rotor are constructed by lining up the plurality of pieces having the same length, and thereby, the numbers thereof only need to be set in accordance with the required specification of the power generator, so that the standardization of the various components can be achieved, thereby enabling low cost.

According to the power generator of the present invention, between the magnet and the retaining ring, division positions in an axial direction are different.

Accordingly, in the division positions of the retaining ring are made different from the division positions of the magnet, which enables robust fixing of the magnet by the retaining ring.

According to the power generator of the present invention, the stator has an iron core axially divided into a plurality of pieces and having a ring shape, and a coil wound around the iron core.

Accordingly, not only the rotor but also the iron core of the stator is axially divided into the plurality of pieces to be constructed, by which in accordance with the required specification of the power generator, an outer diameter of the iron core is uniform, and on the other hand, a number of the divided pieces only needs to be a predetermined number to set an axial length, so that the standardization of the various components can be achieved, thereby enabling low cost. Moreover, since the iron core of the stator is formed of a thin layered steel plate, the above-described axial length setting is easy.

According to the power generation facility of the present invention, the power generation facility includes: a plurality of exhaust gas generating sources; a plurality of turbochargers driven by exhaust gas from the plurality of exhaust gas generating sources; a plurality of power generators connected to the plurality of turbochargers; a plurality of converters that convert AC power generated by the plurality of power generators to DC power; and one or plurality of inverters that convert the DC power outputted from the plurality of converters to AC power; each of the power generators including: a power generator rotary shaft directly connected to a rotary shaft of each of the turbochargers; a rotor fixed to the power generator rotary shaft; and a stator provided outside the rotor, wherein the rotor has: an iron core fixed to the rotary shaft; a magnet fixed to an outer circumferential surface of the iron core and axially divided into a plurality of pieces; and a retaining ring arranged on an outer circumferential surface of the magnet and axially divided into a plurality of pieces.

Accordingly, the magnet and the retaining ring making up the rotor in the power generator are constructed by being axially divided into the plurality of pieces, by which in accordance with a required specification of the power generator, outer diameters of the magnet and the retaining ring are uniform, and on the other hand, axial lengths only need to be set, using predetermined numbers of the divided pieces, so that the standardization of the various components can be achieved, thereby enabling low cost.

3. Advantageous Effects of Invention

According to the power generation facility of the present invention, the plurality of turbochargers driven by the exhaust gas from the plurality of exhaust gas generating sources are provided, and the plurality of power generators are connected to these respective turbochargers, and further the plurality of converters that convert the AC power generated by the plurality of power generators to the DC power, the one inverter that converts this DC power to the AC power, and the control device that controls the plurality of exhaust gas generating sources or the plurality of turbochargers in accordance with the AC power from the inverter are provided, which enables the stable electric power to be generated.

Moreover, according to the power generator or the power generation facility of the present invention, the magnet and the retaining ring making up the rotor in the power generator are constructed by being axially divided into the plurality of pieces, so that the standardization of the various components are achieved, thereby enabling low cost.

DETAILED DESCRIPTION OF THE INVENTION

Hereinafter, referring to the accompanying drawings, preferred embodiments of a power generator and a power generation facility according to the present invention will be described in detail. These embodiments do not limit the present invention, and when there is a plurality of embodiments, the present invention includes an embodiment obtained by combining the respective embodiments.

First Embodiment

Figure 1:
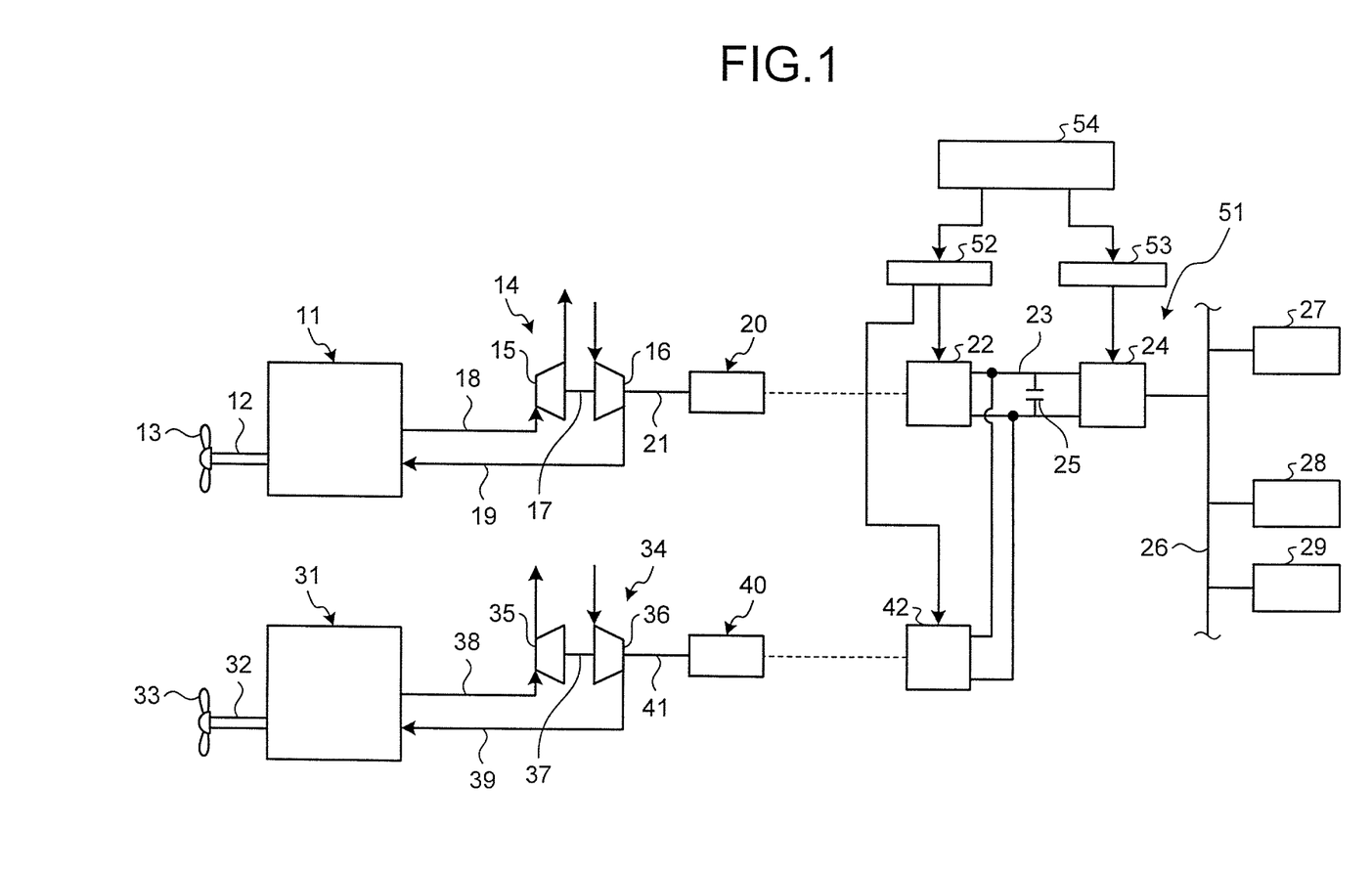
FIG. 1 is a schematic configuration diagram of a power generation facility to which a power generator according to a first embodiment of the present invention is applied.
Figure 2:
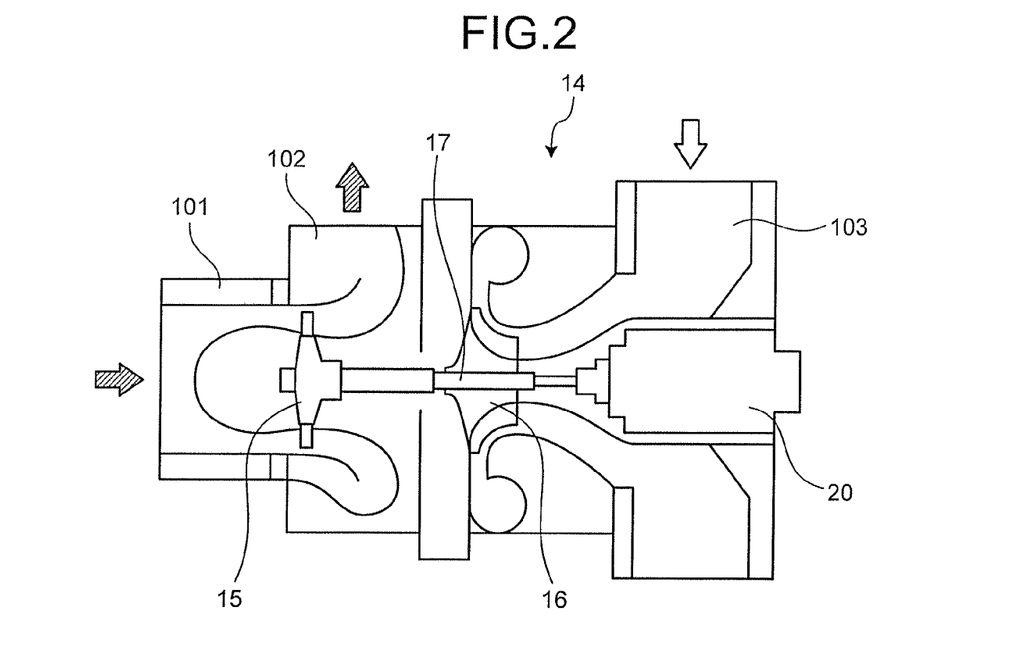
FIG. 2 is a schematic diagram of a turbocharger on which the power generator of the first embodiment is mounted.
Figure 3:
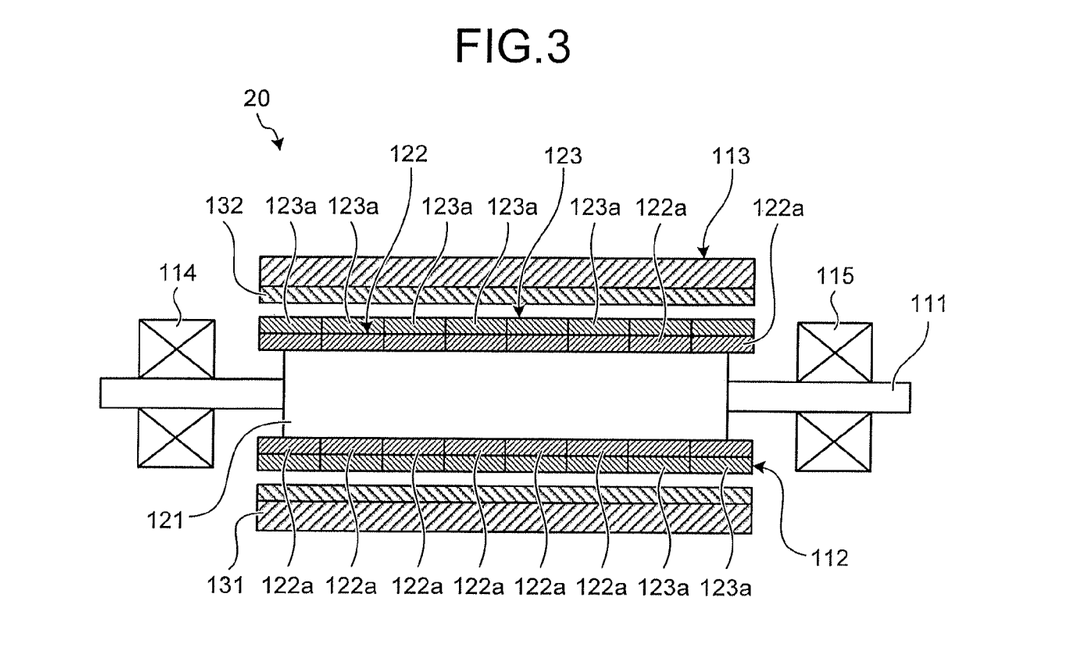
FIG. 3 is a cross-sectional diagram of the power generator of the first embodiment.

FIG. 1 is a schematic configuration diagram of a power generation facility to which a power generator according to a first embodiment of the present invention is applied, FIG. 2 is a schematic diagram of a turbocharger on which the power generator of the first embodiment is mounted, and FIG. 3 is a cross-sectional diagram of the power generator of the first embodiment.

The power generation facility of the first embodiment is mounted on a vessel (not shown). As illustrated in FIG. 1, two diesel engines (exhaust gas generating sources) 11, 31 are driven, using heavy oil as fuel, and function to propel the vessel. That is, in the respective diesel engines 11, 31, propeller shafts 12, 32 are connected to crankshafts (not shown), and screw propellers 13, 33 are attached to the propeller shafts 12, 32.

Two turbochargers 14, 34 are mounted on the respective diesel engines 11, 31, and are constructed by connecting turbines 15, 35 and compressors 16, 36 via rotary shafts 17, 37. Accordingly, in the respective turbochargers 14, 34, when the respective turbines 15, 35 are rotated by exhaust gas exhausted from exhaust passages 18, 38 of the respective diesel engines 11, 31, the respective compressors 16, 36 connected via the rotary shafts 17, 37 are rotated to thereby perform supercharging, which enables the air to be sent into intake passages 19, 39 of the respective diesel engines 11, 31.

The respective turbochargers 14, 34 have power generators 20, 40 coaxially connected thereto. In these power generators 20, 40, rotary shafts 21, 41 thereof are directly connected to the rotary shafts 17, 37 of the respective turbochargers 14, 34. Accordingly, when the respective turbochargers 14, 34 are driven, the respective power generators 20, 40 can output AC power.

An electric power converter 51 rectifies and outputs electric power generated by the respective power generators 20, 40, and has converters 22, 42, a DC link 23, and an inverter 24. That is, the converters 22, 42 are connected to the power generators 20, 40 to rectify the AC power outputted by these power generators 20, 40 and convert the same to DC power. Moreover, the converters 22, 42 are connected to the inverter 24 through the DC link 23, and in the DC link 23, a capacitor 25 is provided. The DC link 23 can charge the DC power converted by the converters 22, 42 to output the DC power stored in the capacitor 25 to the inverter 24. The inverter 24 converts the DC power converted by the converters 22, 42 to predetermined AC power (e.g., 60 Hz, 450 V).

In this case, the electric power converter 51 rectifies and outputs the electric power generated by the two power generators 20, 40, and the two converters 22, 42 are connected to the one inverter 24 through the DC link 23. The inverter 24 is connected to an output system 26, to which a plurality of auxiliary machines 27, 28, 29, . . . are connected.

A converter controller 52 can control the respective converters 22, 42, and an inverter controller 53 can control the inverter 24. A main controller 54 can control the converter controller 52 and the inverter controller 53.

Accordingly, the main controller 54 outputs a DC bus voltage command to the converter controller 52, and outputs a power generation output command to the inverter controller 53. Here, while the inverter controller 53 performs control of the electric power outputted by the inverter 24, based on the power generation output command from the main controller 54, the converter controller 52 controls the respective converters 22, 42 so that a DC bus voltage becomes constant because the electric power from the two converters 22, 42 is supplied to the inverter 24.

The converter controller 52 can perform power generation output control, output torque control, rotation number control over the respective converters 22, 42. Here, the converter controller 52 controls the respective converters 22, 42, for example, so that the power generation output is larger with respect to the power generator 20 or 40 having the higher rotation speed. That is, the converter controller 52 decreases a command rotation number or increases a command torque to the converter on the power generator side having the higher rotation speed. Moreover, the converter controller 52 controls the respective converters 22, 42, for example, so that the power generation output is larger with respect to the power generator 20 or 40 having the smaller torque. That is, the converter controller 52 decreases the command rotation number or increases the command torque to the converter on the power generator side having the smaller torque.

In this case, the respective converters 22, 42 are in a voltage PWM format, and a backflow prevention diode is arranged between a DC bus and themselves to prevent lateral flow between the converters 22, 42 arranged in parallel. However, as long as the converter controller 52 can control the respective converters 22, 42 with high accuracy, this backflow prevention diode is unnecessary.

That is, in the present embodiment, the main controller 54 controls the converters 22, 42 in accordance with the AC power outputted from the inverter 24. That is, the main controller 54 controls the converters 22, 42 so that the AC power outputted from the inverter 24 becomes almost constant.

Here, while details of the turbochargers 14, 34 and the power generators 20, 40 of the present embodiment will be described, these turbochargers 14, 34 and the power generators 20, 40 have almost similar configurations, and only the turbocharger 14 and the power generator 20 will be described.

In the turbocharger 14, as illustrated in FIG. 2, the rotary shaft 17 is rotatably supported at a central portion of a casing 101, the turbine 15 is fixed at one end portion of this rotary shaft 17 integrally rotatably, and the compressor 16 can be fixed integrally rotatably at an intermediate portion. Moreover, in the casing 101, a exhaust gas passage 102 is formed at one end portion, and an upstream side of this exhaust gas passage 102 is connected to the diesel engine 11 (refer to FIG. 1) through the exhaust passage 18. Furthermore, in the casing 101, an intake gas passage 103 is formed at another end portion, and a downstream side of this intake gas passage 103 is connected to the diesel engine 11 (refer to FIG. 1) through the intake passage 19.

Moreover, the power generator 20 is arranged at the other end portion of the casing 101 on a shaft center side with respect to the intake gas passage 103. This power generator 20 has a rotation center coaxial with the rotary shaft 17, and a rotary shaft (power generator rotary shaft) 111 is directly connected to the rotary shaft 17 of the turbocharger 14 through the rotary shaft 21 to be able to rotate integrally.

As illustrated in FIG. 3, this power generator 20 is made up of the rotary shaft 111, a rotor 112 fixed to this rotary shaft 111, and a stator 113 provided outside this rotor 112. The rotary shaft 111 is rotatably supported by bearings 114, 115 in the casing 101 of the power generator 20 to be connected directly to the rotary shaft 17.

In this power generator 20, the rotor 112 is made up of an iron core 121 fixed to the rotary shaft 111, a magnet 122, which is fixed to an outer circumferential surface of this iron core 121 and is axially divided into a plurality of pieces, and a retaining ring 123, which is arranged on an outer circumferential surface of this magnet 122 and is axially divided into a plurality of pieces.

That is, the iron core 121 has a cylindrical shape, and is pressed onto an outer circumferential surface of the rotary shaft 111 to be integrally fixed. In this case, the rotary shaft 111 and the iron core 121 may be integrally formed. The magnet 122 is made up of a plurality of (in the present embodiment, 8) magnet pieces 122a each having the same shape. Each of these magnet pieces 122a has a ring shape (or an arch shape), is set to have a predetermined outer diameter and a predetermined inner diameter, and is set to have a predetermined axial length. By axially continuously disposing the 8 magnet pieces 122a, the magnet 122 having a ring shape (or an arch shape) is constructed, and this magnet 122 is pressed onto (caused to adhere to) the outer circumferential surface of the iron core 121 to be integrally fixed. In the magnet 122 made up of the 8 magnet pieces 122a, an axial length is set to be slightly larger than that of the iron core 121.

The retaining ring 123 is made up of a plurality of (in the present embodiment, 8) retaining ring pieces 123a having the same shape. Each of these retaining ring pieces 123a has a ring shape, is set to have a predetermined outer diameter and a predetermined inner diameter, and set to have a predetermined axial length. By axially continuously disposing the 8 retaining ring pieces 123a, the retaining ring 123 having a ring shape is constructed, and this retaining ring 123 is pressed onto (caused to adhere to) the outer circumferential surface of the magnet 122 to be integrally fixed. The retaining ring 123 made up of the 8 retaining ring pieces 123*a* is set to have an axial length slightly larger than that of the iron core 121, and the same as that of the magnet 122.

In this case, the magnet 122 and the retaining ring 123 have the same axial length and the same number of divisions, which conforms division positions, that is, contact positions between the magnet pieces 122*a* and contact positions between the retaining ring pieces 123*a*. However, the present embodiment is not limited to this constitution, the axial division positions in the magnet 122 and the retaining ring 123 may be made different. For example, while the magnet 122 and the retaining ring 123 have the same axial length, the numbers of divisions of both are made different, by which the division positions can be made different. That is, the magnet 122 may be made up of the 8 pieces, and the retaining ring 123 may be made up of the 7 pieces.

On the other hand, the stator 113 is made up of an iron core 131, which is axially divided into a plurality of pieces, and has a ring shape, and a coil 132 wound around a slot portion of this iron core 131. That is, the iron core 131 has a cylindrical shape with a slot, and is fixed inside a case having a cylindrical shape (not illustrated). In this case, although not illustrated, the iron core 131 is made up of a plurality of thin plate pieces having the same shape. Each of these thin plate pieces has a disk shape with a slot, is set to have a predetermined outer diameter and a predetermined inner diameter, and is set to have a predetermined axial thickness. By axially (thicknesswise) continuously disposing the plurality of disk pieces, the iron core 131, having a ring shape, is constructed. The iron core 131 made up of the plurality of thin plate pieces is set to have the same axial length as that of the magnet 122 and the retaining ring 123 of the rotor 112.

Moreover, the coil 132 is wound inside the iron core 131 by a predetermined number of times. This number of turns of the coil is set, based on a power generator required specification voltage. For example, while if the axial length of the power generator 20 becomes twice, the number of turns of the coil may be doubled, but a current is ½, and thus, if joule loss is made equal, a coil wire diameter becomes ½, so that a radial dimension does not change.

In the power generator 20 constructed in this manner, the axial length of the rotor 112 and the stator 113 is set, based on a power generator required specification set, using, as references, the rotation speed of the turbocharger 14 and the output that the power generator 20 can generate. That is, if the output of the power generator 20 is P, a torque is T, and an angular speed is ω, P=T·ω, and the angular speed ω is proportional to a rotation speed N. Thus, since the output P and the angular speed ω (the rotation speed N) of the power generator 20 are set as the power generator required specification, the torque T needs to be adjusted to thereby satisfy this power generator required specification. Here, since the torque T can be replaced by a volume (capacity) of the power generator, the adjustment of the torque T is enabled by changing the outer diameter and the axial length of the power generator 20, that is, those of the rotor 112 and the stator 113. In the present embodiment, by changing the axial length of the rotor 112 and the stator 113 without changing the outer diameters thereof, the torque T can be adjusted, which enables various power generator required specifications to be addressed.

That is, the magnet piece 122*a* in the magnet 122, the retaining ring piece 123*a* in the retaining ring 123, and the disk piece in the iron core 131 are each set as one unit, and the numbers of pieces are set in accordance with the respective axial lengths. That is, one type of the magnet pieces 122*a*, one type of the retaining ring pieces 123*a*, one type of the disk pieces are only manufactured, and the respective numbers of pieces are set, based on the power generator required specification, so that the desired magnet 122, the retaining ring 123, the iron core 131 corresponding to the power generator required specification can be manufactured.

In the magnet 122, the retaining ring 123, and the iron core 131, the axial lengths of the magnet piece 122*a*, the retaining ring piece 123*a*, and the disk piece may be set as needed, and the plurality types of axial lengths may be provided in accordance with the applied power generator, so that the magnet 122, the retaining ring 123 and the iron core 131 having the different axial lengths may be combined.

In this manner, the power generation facility of the first embodiment is provided with the plurality of diesel engines 11, 31, the plurality of turbochargers 14, 34 driven by the exhaust gas of the plurality of diesel engines 11, 31, the plurality of power generators 20, 40 connected to the plurality of turbochargers 14, 34, the plurality of converters 22, 42 that convert the AC power generated by the plurality of power generators 20, 40 to the DC power, the one inverter 24 that converts the DC power outputted from the plurality of converters 22, 42 to the AC power, and the main controller 54 that controls the converters 22, 42 in accordance with the AC power from the inverter 24.

Accordingly, the only one inverter 24 suffices as the electric power converter 51, which enables simplification of the configuration, space saving, and low cost. Moreover, the converters 22, 42 are controlled in accordance with the AC power from the inverter 24, by which the stable electric power can be generated.

Moreover, the power generator of the first embodiment is made up of the rotary shaft 111, the rotor 112 fixed to this rotary shaft 111, and the stator 113 provided outside the rotor 112, and the rotor 112 is made up of the iron core 121 fixed to the rotary shaft 111, the magnet 122 fixed to the outer circumferential surface of the iron core 121 and axially divided into the plurality of pieces, and the retaining ring 123 arranged on the outer circumferential surface of the magnet 122 and axially divided into the plurality of pieces.

Accordingly, the magnet 122 and the retaining ring 123 making up the rotor 112 are constructed by being axially divided into the plurality of pieces, by which in accordance with the power generator required specification, the outer diameters of the magnet 122 and the retaining ring 123 are uniform, and on the other hand, the axial lengths only need to be set, using the predetermined numbers of the divided pieces 122*a*, 123*a*, so that the standardization of the various components can be achieved, thereby enabling low cost.

Moreover, in the power generator of the first embodiment, the magnet 122 has a ring shape (or arch shape) and the plurality of magnet pieces 122*a* having the same outer diameter and axial length are provided, and the retaining ring 123 has a ring shape and the plurality of retaining ring pieces 123*a* having the same outer diameter and axial length are provided to be fitted and fixed onto the outer circumferential surface of the magnet 122. Accordingly, the magnet 122 and the retaining ring 123 making up the rotor 112 are constructed by lining up the plurality of pieces 122*a*, 123*a* each having the same length, by which the numbers of pieces only need to be set in accordance with the required specification of the power generators 20, 40, so that the standardization of the various components can be achieved, thereby enabling low cost.

Moreover, in the power generator of the first embodiment, between the magnet 122 and the retaining ring 123, the division positions in the axial direction are different. Accordingly, making the division positions of the retaining ring 123 different from the division positions of the magnet 122 enables robust fixing of the magnet 122 by the retaining ring 123.

Moreover, in the power generator of the first embodiment, the stator 113 is made up of the iron core 131 axially divided into the plurality of pieces and having a ring shape, and the coil 132 wound around this iron core 131. Accordingly, not only the rotor 112 but also the iron core 131 of the stator 113 is axially divided into the plurality of pieces to be constructed, by which in accordance with the required specification of the power generators 20, 40, the outer diameter of the iron core 131 is uniform, and on the other hand, the number of divided thin plate pieces only needs to be a predetermined number to set the axial length, so that the standardization of the various components can be achieved, thereby enabling low cost.

Second Embodiment

Figure 4:
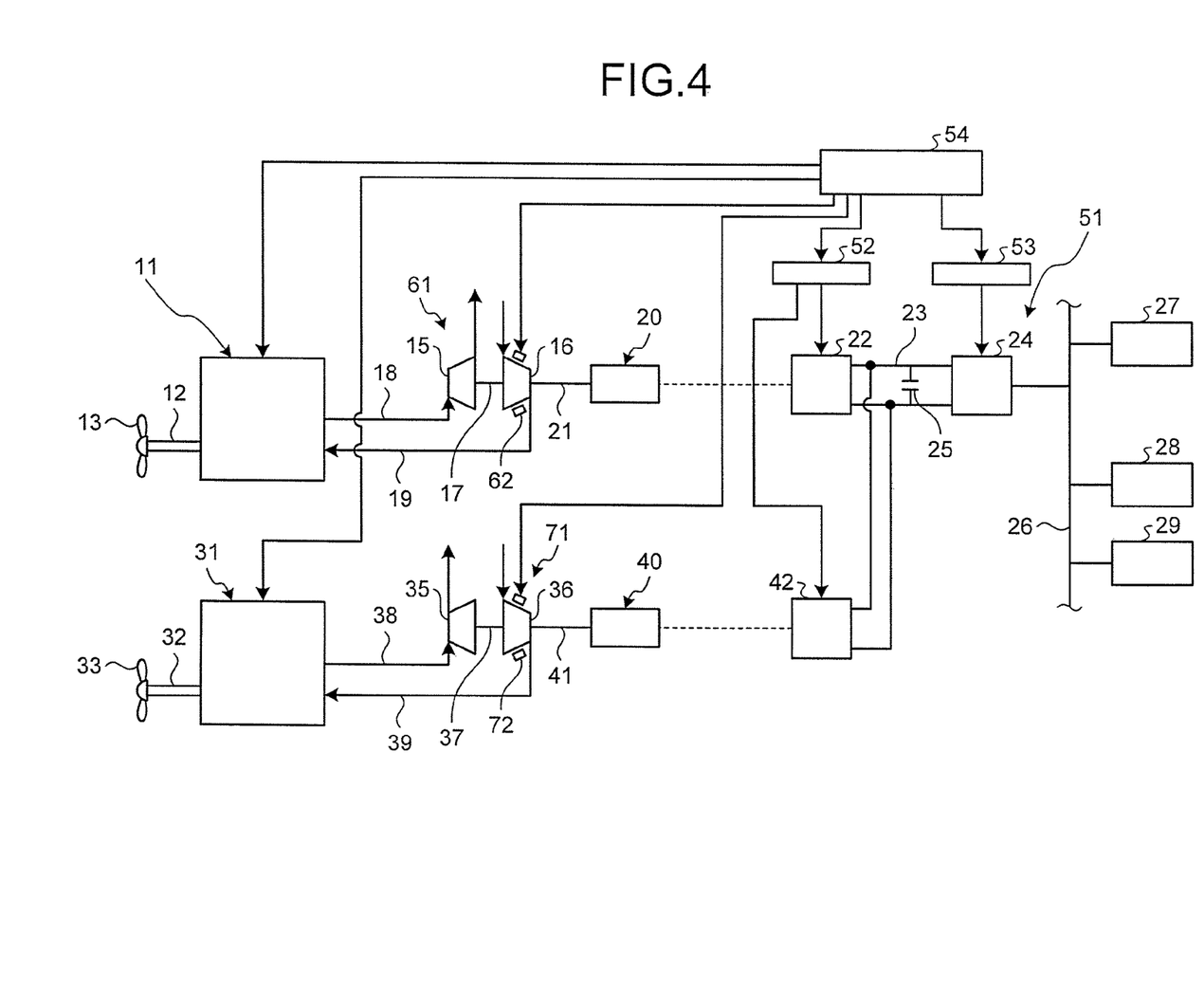
FIG. 4 is a schematic configuration diagram of a power generation facility to which a power generator according to a second embodiment of the present invention is applied.

FIG. 4 is a schematic configuration diagram of a power generation facility to which a power generator according to a second embodiment of the present invention is applied. Members having similar functions to those in the above-described embodiment are given the same reference numerals, and detailed descriptions thereof are omitted.

As illustrated in FIG. 4, the power generation facility of the second embodiment has two diesel engines 11, 31, two turbochargers 61, 71, power generators 20, 40, and an electric power converter 51.

Here, the turbochargers 61, 71 of the present embodiment are mounted on the respective diesel engines 11, 31, and are constructed by connecting turbines 15, 35 and compressors 16, 36 via rotary shafts 17, 37. Moreover, these turbochargers 61, 71 are variable capacity type turbochargers, and variable nozzle mechanisms (nozzle vanes) 62, 72 that can control a capacity of exhaust gas brought to the turbines 15, 35 are provided. In each of these variable nozzle mechanisms 62, 72, although not illustrated, an actuator is driven to rotate a drive ring to thereby swing a lever plate and change a blade angle of the nozzle vane, which enables the capacity of the exhaust gas brought to the turbines 15, 35 to be adjusted.

Accordingly, in the respective turbochargers 61, 71, when the respective turbines 15, 35 are rotated by the exhaust gas exhausted from exhaust passages 18, 38 of the respective diesel engines 11, 31, the respective compressors 16, 36 connected via the rotary shafts 17, 37 are rotated to thereby perform supercharging, which enables the air to be sent into intake passages 19, 39 of the respective diesel engines 11, 31. At this time, the capacity of the exhaust gas to be brought to the turbines 15, 35 is adjusted by the variable nozzle mechanisms 62, 72, so that an intake amount sent into the respective diesel engines 11, 31, that is, supercharging pressure can be adjusted.

The respective turbochargers 61, 71 have the power generators 20, 40 coaxially connected thereto. In these power generators 20, 40, rotary shafts 21, 41 thereof are directly connected to the rotary shafts 17, 37 of the respective turbochargers 61, 71. Accordingly, when the respective turbochargers 61, 71 are driven, the respective power generators 20, 40 can output AC power.

The electric power converter 51 rectifies and outputs electric power generated by the respective power generators 20, 40, and has converters 22, 42, a DC link 23, and an inverter 24. The inverter 24 is connected to an output system 26, to which a plurality of auxiliary machines 27, 28, 29, . . . are connected.

A converter controller 52 can control the respective converters 22, 42, and an inverter controller 53 can control the inverter 24. A main controller 54 can control the converter controller 52 and the inverter controller 53, and can control the respective diesel engines 11, 31, and the respective turbochargers 61, 71 (variable nozzle mechanisms 62, 72).

Accordingly, the main controller 54 outputs a DC bus voltage command to the converter controller 52, and outputs a power generation output command to the inverter controller 53. Here, while the inverter controller 53 performs control of the electric power outputted by the inverter 24, based on the power generation output command from the main controller 54, since the electric power from the two converters 22, 42 is supplied to the inverter 24, the converter controller 52 controls the respective converters 22, 42 so that a DC bus voltage becomes constant.

Moreover, in the present embodiment, the main controller 54 controls the diesel engines 11, 31 and the turbochargers 61, 71 (the variable nozzle mechanisms 62, 72) in accordance with the AC power outputted from the inverter 24. That is, the main controller 54 controls the diesel engines 11, 31 and the variable nozzle mechanisms 62, 72 of the turbochargers 61, 71 so that the AC power outputted from the inverter 24 becomes almost constant.

That is, the main controller 54 controls the inverter controller 53 and the converter controller 52 so that the AC power outputted from the inverter 24 becomes almost constant. However, since driving force of the diesel engines 11, 31 is also used for propulsion power of the vessel, fluctuation in the driving force causes fluctuation in the rotation speed of the power generators 20, 40, that is, the power generation amount.

Thus, the main controller 54 controls the diesel engines 11, 31 within a range where the propulsion force of the vessel does not fluctuate so that the rotation speed of the power generators 20, 40 does not fluctuate. These control contents of the diesel engines 11, 31 include, for example, an intake air amount, a fuel supply amount, ignition timing, the rotation speed and the like.

Moreover, the main controller 54 controls the supercharging pressure in the turbochargers 61, 71 within the range where the propulsion force of the vessel does not fluctuate so that the rotation speed of the power generators 20, 40 does not fluctuate. That is, the main controller 54 adjusts the capacity of the exhaust gas brought to the turbines 15, 35 by the variable nozzle mechanisms 62, 72 to thereby adjust the intake amount sent to the respective diesel engines 11, 31, that is, the supercharging pressure.

Although the above-described turbochargers 61, 71 are of a variable capacity type, the other configurations are similar to those of the first embodiment, in which the power generators 20, 40 are contained inside. Rotary shafts of these power generators 20, 40 are directly connected to the rotary shafts 17, 37 of the turbochargers 61, 71 integrally rotatably, and the other configurations are similar to those of the first embodiment.

In this manner, the power generation facility of the second embodiment is provided with the plurality of diesel engines 11, 31, the plurality of turbochargers 61, 71 driven by the exhaust gas of the plurality of diesel engines 11 31, the plurality of power generators 20, 40 connected to the plurality of turbochargers 61, 71, the plurality of converters 22, 42 that convert the AC power generated by the plurality of power generators 20, 40 to the DC power, the one inverter 24 that converts the DC power outputted from the plurality of converters 22, 42 to the AC power, and the main controller 54 that controls the converters 22, 42 in accordance with the AC power from the inverter 24.

Accordingly, the only one inverter 24 suffices as the electric power converter 51, which enables simplification of configuration, space saving and low cost. Moreover, the converters 22, 42 are controlled in accordance with the AC power from the inverter 24, by which the stable electric power can be generated.

Moreover, in the power generation facility of the second embodiment, the main controller 54 controls the plurality of diesel engines 11, 31 and the plurality of turbochargers 61, 71 in accordance with the AC power from the inverter 24. Accordingly, the diesel engines 11, 31 and the turbochargers 61, 71 are controlled so that the AC current power from the inverter 24 becomes desired electric power, which enables the stable electric power to be generated.

In this case, the main controller 54 controls the intake air amount, the fuel supply amount, the ignition timing, the rotation speed and the like of the diesel engines 11, 31, which enables the stable electric power to be generated. Moreover, since the turbochargers 61, 71 are of the variable capacity type, the main controller 54 controls the variable nozzle mechanisms 62, 72 in the turbochargers 61, 71 to thereby adjust the supercharging pressure, and thus, the exhaust gas amount, flow velocity and the like are adjusted to thereby control the supercharging pressure, by which the stable electric power can be generated.

While in the power generation facility of each of the above-described embodiments, the two diesel engines 11, 31 are applied as the plurality of exhaust gas generating sources, and the two turbochargers 14, 34 or 61, 71 are provided, the number of them are not limited to two, but may be three or more. Moreover, the exhaust gas generating sources are not limited to the diesel engines, but may be respective cylinders in these diesel engines, and the turbocharger may be arranged in each of the cylinders. Furthermore, the exhaust gas generating sources are not limited to the diesel engines, but only need to be ones that generate the exhaust gas, and may be gas turbines or the like.

The power generator according to the present invention achieves standardization of various components by axially dividing the rotor, thereby enabling low cost, and can be applied to any power generator and power generation facility.

REFERENCE NUMERALS LIST

11, 31 diesel engine (exhaust gas generating source)
14, 34, 61, 71 turbocharger
20, 40 power generator
22, 42 converter
23 DC link
24 inverter
51 electric power converter
52 converter controller
53 inverter controller
54 main controller
111 rotary shaft
112 rotor
113 stator
121 iron core
122 magnet
122a magnet piece (divided piece)
123 retaining ring
123a retaining ring piece (divided piece)
131 iron core
132 coil

The invention claimed is:

1. A power generation facility, comprising:
a plurality of exhaust gas generating sources;
a plurality of turbochargers driven by exhaust gas from the plurality of exhaust gas generating sources;
a plurality of power generators connected to the plurality of turbochargers;
a plurality of converters for converting AC power generated by the plurality of power generators to DC power;
one inverter or a plurality of inverters for converting the DC power output from the plurality of converters to AC power; and
a control device for controlling one of the plurality of exhaust gas generating sources, the plurality of turbochargers and the plurality of converters in accordance with the AC power from the one inverter or the plurality of inverters,
wherein each of the power generators comprises:
a power generator rotary shaft directly connected to a rotary shaft of each of the turbochargers;
a rotor fixed to the power generator rotary shaft; and a stator provided outside the rotor,
wherein the rotor includes:
an iron core fixed to the power generator rotary shaft, the iron core having a cylindrical shape;
a magnet fixed to an outer circumferential surface of the iron core and axially divided into a plurality of pieces; and
a retaining ring arranged on an outer circumferential surface of the magnet and axially divided into a plurality of pieces, and
wherein, in a direction of an axial direction of the power generator rotary shaft, (i) a length of the magnet is substantially the same as the length of the retaining ring and (ii) the length of the magnet and the length of the retaining ring are longer than the length of the iron core.

2. The power generation facility according to claim 1, wherein the magnet has a ring shape or an arch shape, and has the divided pieces of a same outer diameter and a same axial length, and the retaining ring has a ring shape, has the divided pieces of a same outer diameter and a same axial length, and is fitted and fixed onto the outer circumferential surface of the magnet.

3. The power generation facility according to claim 1, wherein between the magnet and the retaining ring, division positions in an axial direction are different.

4. The power generation facility according to claim 1, wherein the stator has an iron core axially divided into a plurality of pieces and having a ring shape, and a coil wound around the iron core.

* * * * *